United States Patent

Hayashi et al.

Patent Number: 5,528,631
Date of Patent: Jun. 18, 1996

[54] π/4 SHIFTED DQPSK MODULATOR

[75] Inventors: Takahisa Hayashi, Oume; Tomohiro Matsuda, Fuchu; Mutsumu Serizawa, Tokyo, all of Japan

[73] Assignee: Kabushiki Kaisha Toshiba, Japan

[21] Appl. No.: 360,710

[22] PCT Filed: Feb. 23, 1994

[86] PCT No.: PCT/JP94/00276

§ 371 Date: Dec. 21, 1994

§ 102(e) Date: Dec. 21, 1994

[87] PCT Pub. No.: WO94/26050

PCT Pub. Date: Nov. 10, 1994

[30] Foreign Application Priority Data

Apr. 30, 1993 [JP] Japan .................. 5-104586

[51] Int. Cl.⁶ .................................................. H04L 27/20
[52] U.S. Cl. .................. 375/283; 375/308; 332/103; 332/104
[58] Field of Search .................. 375/281, 283, 375/308; 333/18, 28; 364/724.19, 724.2; 332/103, 104

[56] References Cited

U.S. PATENT DOCUMENTS

| | | | |
|---|---|---|---|
| 5,157,693 | 10/1992 | Lemersal et al. | 375/308 |
| 5,210,775 | 5/1993 | Takahara et al. | 375/308 |
| 5,285,479 | 2/1994 | Iwane | 375/295 |
| 5,361,047 | 11/1994 | Takahara et al. | 375/308 |
| 5,363,410 | 11/1994 | Hayashi et al. | 375/283 |
| 5,369,378 | 11/1994 | Kosaka et al. | 375/283 |
| 5,373,532 | 12/1994 | Fujita et al. | 375/308 |

FOREIGN PATENT DOCUMENTS 3-235553 10/1991 Japan.
4-239245 8/1992 Japan.

Primary Examiner—Stephen Chin
Assistant Examiner—T. Ghebretinsae
Attorney, Agent, or Firm—Banner & Allegretti, Ltd.

[57] ABSTRACT

A π/4 shifted DQPSK modulator includes a mapping/filtering circuit (6) equipped with a mapping function and filtering function. The mapping/filtering circuit (6) allows phase information which is obtained for each symbol to be shift-input to its shift register (61, 62, 63) and sequentially reads out filter-processed filter factor data corresponding to 256 samples initially stored in a factor memory circuit (7) and allows the filter factor data to be converted to numerical values based on position information corresponding to 10 symbols output in parallel manner from the shift register (61, 62, 63). According to this circuit (6), it is possible to obtain filtered mapping data MF. Therefore, the modulator has less number of gates of the filter and can be embodied with a very simplified compact circuit configuration.

4 Claims, 10 Drawing Sheets

| $X_K$ | $Y_K$ | $\Delta\phi$ |
|---|---|---|
| 1 | 1 | $-\dfrac{3\pi}{4}$ |
| 0 | 1 | $\dfrac{3\pi}{4}$ |
| 0 | 0 | $\dfrac{\pi}{4}$ |
| 1 | 0 | $-\dfrac{\pi}{4}$ |

| SHIFT REGISTER | | | I | | Q | |
|---|---|---|---|---|---|---|
| | | | ANDS | XORS | ANDS | XORS |
| 0 | 0 | 0 | 1 | 0 | 1 | 0 |
| 0 | 0 | 1 | 0 | 0 | 1 | 0 |
| 0 | 1 | 0 | 1 | 1 | 1 | 0 |
| 0 | 1 | 1 | 1 | 1 | 0 | 0 |
| 1 | 0 | 0 | 1 | 1 | 1 | 1 |
| 1 | 0 | 1 | 0 | 0 | 1 | 1 |
| 1 | 1 | 0 | 1 | 0 | 1 | 1 |
| 1 | 1 | 1 | 1 | 0 | 0 | 0 |
F I G. 11
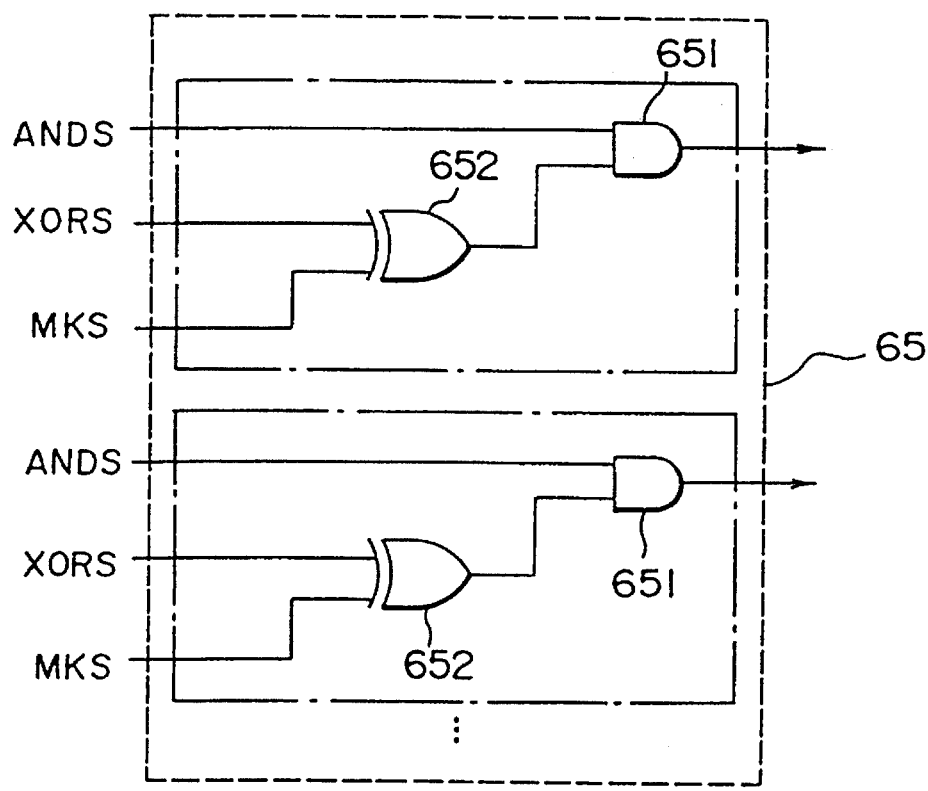
F I G. 12

π/4 SHIFTED DQPSK MODULATOR

TECHNICAL FIELD

The present invention relates to a modulator which is provided in a digital radio communications apparatus, such as a digital portable telephone set, digital mobile telephone set and digital cordless telephone set and, in particular, a modulator using, as a modulation system, a π/4 shifted, differentially encoded quadrature phase shift keying (hereinafter referred to as a π/4 shifted DQPSK) system.

BACKGROUND ART

In recent years, a cellular radio telephone system adopting a digital system has been proposed as one radio communications system. This type of system transmits, in digitized form, communication information, such as a speech message between a base station and a mobile unit in addition to a control signal. This system has several advantages in that it is possible to improve privacy, to secure data/system compatibility, and to effectively utilize the radio frequency.

The digital radio communications apparatus including this type of system uses, for example, a π/4 shifted DQPSK system and is so constructed as, for example, set out below. FIG. 1 is a block diagram showing an arrangement of the modulator.

A transmission stream SD is converted by a serial/parallel conversion circuit (S/P) 1 into two data streams $X_k$ and $Y_k$. Here, the transmission data stream is comprised of an NRZ signal of, for example, 0 to 5 V.

These data streams $X_k$ and $Y_k$ are differentially coded by a differential coding circuit 2 into the following:

$$I_k = I_{k-1}\cos[\Delta\phi(X_k, Y_k)] - Q_{k-1}\sin[\Delta\phi(X_k, Y_k)]$$
$$Q_k = I_{k-1}\sin[\Delta\phi(X_k, Y_k)] + Q_{k-1}\cos[\Delta\phi(X_k, Y_k)]$$

where $I_{k-1}, Q_{k-1}$: the amplitude of the coded data at one previous pulse time; and $\Delta\phi$: an amount of phase variation.

The amount of phase variation, $\Delta\phi$, is determined by the amplitudes of the input data streams $X_k, Y_k$ as shown in FIG. 3. As the amplitude value of the coded data $I_k, Q_k$, one is selected out of five values, that is, 0, ±1, ±√2.

The coded data $I_k, Q_k$ delivered from the differential coding circuit 2 are input to a mapping circuit 3. At each pulse time of the coded data $I_k, Q_k$ delivered from the differential coding circuit 2, the mapping circuit 3 determines, based on the phase mapping position of the coded data $I_{k-1}, Q_{k-1}$ obtained at one previous pulse time, the phase mapping position of the coded data $I_k, Q_k$ at this current pulse time.

FIG. 4 is a phase space diagram representing the phase mapping positions of the coded data $I_k, Q_k$ delivered from the mapping circuit 3. As evident from this diagram, the mapping position is so determined that, at each pulse time, any of those positions indicated by □ in FIG. 4 and any of those positions indicated by o in FIG. 4 are so determined as to be alternately selected.

The phase mapping positions of the coded data MI, MQ have eight combinations: (+I, +Q), (0, +Q), (−I, +Q), (−I, 0), (−I, −Q), (0, −Q), (+I, −Q), and (+I, 0). These combinations are represented by (+I, 0, −I) and (+Q, 0, −Q). Here, +I, +Q show the positive positions on the I axis, Q axis, respectively, and −I, −Q show the negative positions on the I axis, Q axis, respectively.

The coded data MI, MQ delivered from the mapping circuit 3 is input to a roll-off filter 4 where they are subjected to low-pass filtering processing. The roll-off filter 4 is used to reduce an influence resulting from the interference between those codes generated on a transmission path. The roll-off filter 4 is comprised of such a transversal type FIR filter as shown, for example, in FIG. 2. Given that, as here, one symbol (i.e., transmission unit: 2 bits in the π/4 shifted DQPSK modulation system) is represented by 256 samples, it is necessary that the signal entering the filter 4 corresponds to one obtained by sampling one symbol into 1/256 parts. If the impulse response of the filter is 10 symbols, filtering is carried out such that each sample of input data in (i.e., in 10×256 samples)=2,560 samples is multiplied by a corresponding factor.

The frequency response $|H(f)|$ of the filter is represented by, for example, the following:

For $0 \leq f \leq (1 - \alpha)/2T$ (1)
$|H(f)| = 1$.

For $(1 - \alpha)/2T \leq f \leq (1 + \alpha)/2T$ (2)
$|H(f)| = \sqrt{1/2\{1 - \sin[\pi(2fT - 1)/2\alpha]\}}$ For $f > (1 + \alpha)/2T$ (3)
$|H(f)| = 0$ Here, T represents a symbol period and a roll-off factor α is for determining a transition band and, for example, 0.35.

The coded data (base band signals) MFI, MFQ delivered from the roll-off filter 4 are input to a quadrature modulator 5 where the coded data MFI, MFQ are quadrature modulated to a transmit intermediate signal corresponding to a radio channel frequency. The modulated transmit intermediate signal SIF is supplied to a transmitting circuit, not shown, for a radio transmission to be carried out.

Although not shown, the quadrature modulator comprises an oscillator, phase shifter for 90° phase-shifting the output of the oscillator, first multiplier for multiplying the output of the oscillator and MFI, second multiplier for multiplying the output of the phase shifter and MFQ and an adder for adding together the outputs of the first and second multiplies. With the outputs of the oscillator given by A cos(ωct), the transmit intermediate signal SIF is represented by $$SIF(t) = \sum_n g(t - nT)\cos\Phi_n \cos\omega ct - \sum_n g(t - nT)\sin\Phi_n \sin\omega ct$$

Here, g(t): the pulse shaping function,

ωc: the angular frequency of a carrier wave, $\Phi_n$: the absolute value of the phase corresponding to an n-th symbol period.

$\Phi_n$ obtained through the differential decoding is represented as follows:

$\Phi_n = \Phi_{n-1} + \Delta\Phi_n$

Such π/4 shifted DQPSK system, being used, can suppress the broadening of a signal band.

However, the conventional π/4 shifted DQPSK modulator presents the following problem.

That is, given that one symbol of the coded data is represented with 256 samples, serial data corresponding to the 256 samples is delivered via respective I and Q channels from the mapping circuit 3 for each symbol and enters the roll-off filter 4. As evident from FIG. 2, therefore, the roll-off filter 4, being comprised of the transversal type filter, must include a shift register 41 having 2,560 steps corresponding to the 256 samples, 2,560 multipliers and 2,560 gates (not shown), for supplying factors to the corresponding multipliers 42. Further, since such transversal filter is required for each channel, the number of elements involved becomes doubled. Therefore, the circuit configuration of the modulator becomes very bulky and, in view of the many gates involved, it has not been possible to expect the realization of a compact circuit configuration.

Generally, with the mobile radio communications system, such as the portable telephone set or cordless telephone set, one of the important tasks is to make the system compact and light in weight. The problem thus posed provides a great bar to realizing a small and light-weight communication system.

It is accordingly the object of the present invention to provide a π/4 shifted DQPSK modulator which can reduce the number of gates of a filter and, by so doing, largely reduce the size of a resultant circuit configuration.

Disclosure of Invention

In order to achieve the aforementioned object of the present invention, a π/4 shifted DQPSK modulator of the present invention obtains, for a respective symbol of a plurality of series of data streams, position information on a phase amplitude plane of a carrier carrying a specific symbol from both the bit information of the specific symbol and the position information on a phase amplitude plane of the carrier carrying one previous symbol, shift-inputs the position information serially to a plurality of stages of shift registers in synchronism with a symbol rate, and detects amplitude information from the respective position information output in parallel form from the shift register. The modulator further delivers an address in synchronism with a sample clock of a frequency plural-times the symbol rate, outputs filter factor information corresponding to a predetermined stage of the shift register on the basis of the address and position information stored in the predetermined stage of the shift register, calculates the filter factor information and respective amplitude information to find a total sum of results of calculations, and generates the total sum as modulated data which has been wave-shaped.

The modulator of the present invention is characterized in that the amplitude information detecting means detects amplitude information of an in-phase component and amplitude information of a quadrature component from the respective position information output in parallel form from the shift register, and outputs the corresponding amplitude information in a time division manner; and the calculating means calculates the filter factor information output from the memory means and amplitude information of the in-phase component and the quadrature phase component output from the amplitude information detecting means, in a time division manner, and outputs results of calculation; and the total sum finding means finds a total sum of the results of calculations output from the calculating means in a time division manner, and separates this total sum output into a total sum output corresponding to the in-phase component and a total sum output corresponding to the quadrature phase component.

The modulator of the present invention is also characterized in that the memory means initially stores the filter factor information subjected to filtering processing.

The modulator of the present invention is further characterized in that the memory means stores, out of an impulse response of a root roll-off filter having an axial symmetry with a maximum amplitude point as a center, only those characteristics on one side of the maximum amplitude point; and when the other side's characteristics not stored in the memory means is to be read out, the address generating means supplies an address to the memory means in a manner to have its count value logically inverted.

According to the present invention, each time one symbol position information is shift-input to the shift register, the filter factor information is sequentially read at a predetermined sample cycle out of the memory means and calculated with the position information and, after the results of calculation have been wave-shaped, corresponding modulated data is generated at a corresponding sample period. That is, the wave-shaped modulated data is obtained at the corresponding sample cycle by sequentially varying the filter factor information in a time sequential manner while the position information is fixed. Therefore, it is only necessary to prepare a shift register of those stages corresponding to the number of symbols required. Further, the calculating means also has only to be provided in that number corresponding to the number of the stages of the shift register. The resultant circuit arrangement becomes much simplified and compact in comparison with a conventional circuit where it is necessary to provide a shift register having those stages corresponding to the number of symbols×the number of samples required as well as calculating means having a number equal to that of the stages of the shift register.

According to the present invention, calculation is performed on the amplitude information detected from the position information and filter factor information, in the time division manner, instead of being performed on an in-phase component and quadrature component in a parallel manner. Therefore, calculation processing, etc., can be performed by a single circuit and a resultant circuit configuration can be made more simplified and compact.

According to the present invention, since the filter factor information subjected to filtering processing are initially stored in the memory means, the calculating means can be obtained with a simpler gate circuit arrangement without the need to use multipliers. A resultant circuit arrangement is still further simplified and made compact.

According to the present invention, attention is paid to the fact that the impulse response of the root roll-off filter provides an axial symmetry with a maximum amplitude point as a center and the one-side characteristics of this axial symmetry's impulse response are stored in the memory means and, in this respect it is possible to halve the memory capacity of the memory means is comparison with the case where all the characteristics have to be stored in the memory means.

BRIEF DESCRIPTION OF THE DRAWINGS

FIG. 11 is a view showing a corresponding relation of position information input to a numerical value conversion control signal generating unit to an output control signal for the mapping/filtering circuit in FIG. 6;

FIG. 12 is a circuit diagram showing an arrangement of the numerical value conversion unit in the mapping/filtering circuit shown in FIG. 6;

BEST MODE OF CARRYING OUT THE INVENTION

The present invention will be explained below in more detail with reference to the accompanying drawings.

Figure 1:
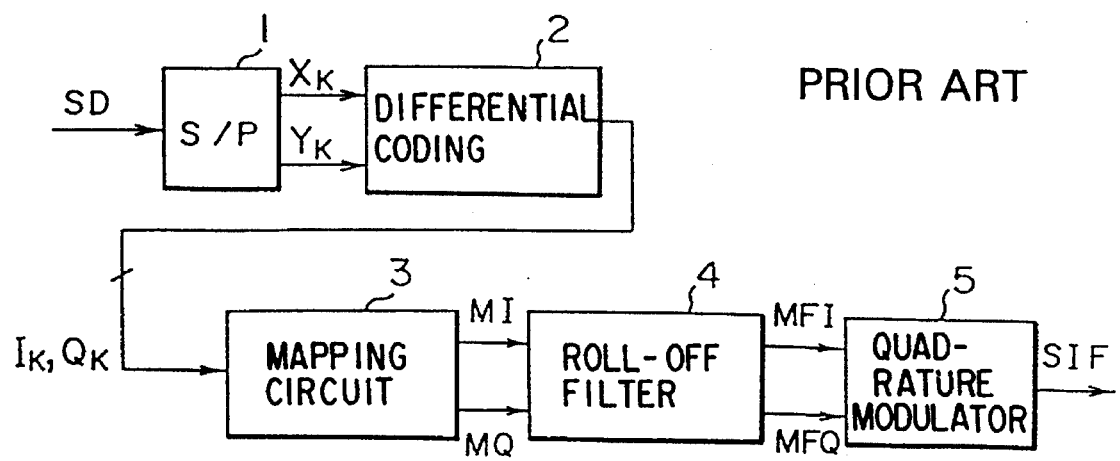
FIG. 1 is a block circuit diagram showing one example of a conventional π/4 shifted DQPSK modulator.
Figure 2:
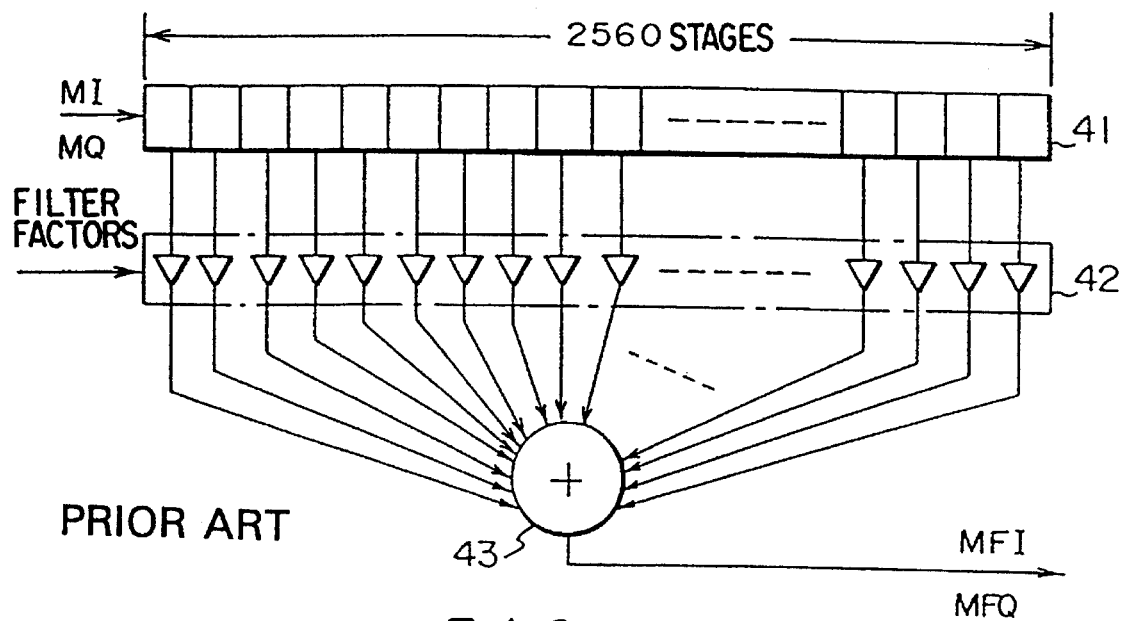
FIG. 2 is a block circuit diagram showing one example of a roll-off filter circuit for use in the conventional π/4 shifted DQPSK modulator.
Figure 5:
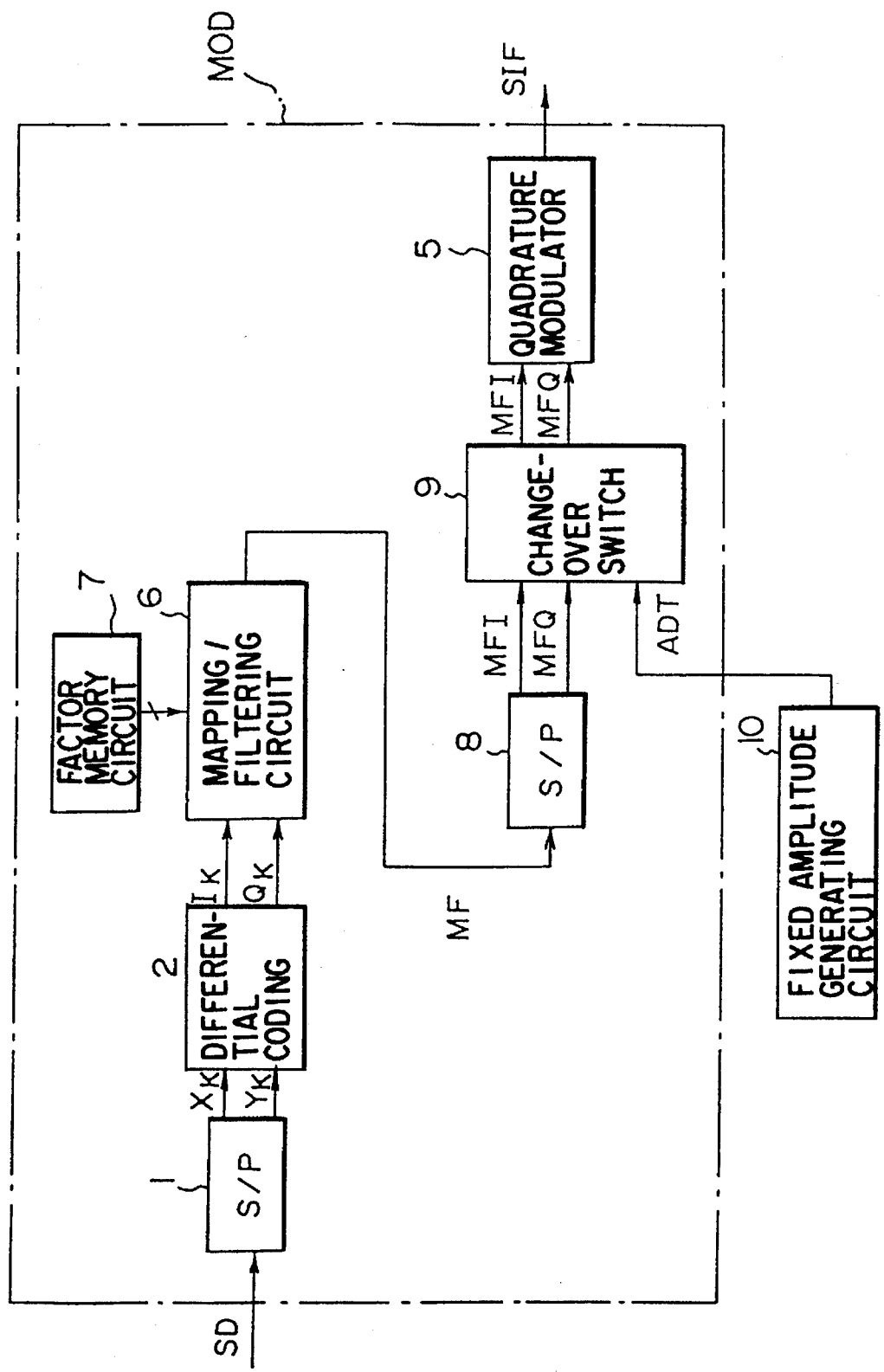
FIG. 5 is a block circuit diagram showing a π/4 shifted DQPSK modulator according to a first embodiment of the present invention.

FIG. 5 is a block circuit diagram showing an arrangement of a π/4 shifted DQPSK modulator (MOD) according to a first embodiment of the present invention. Explanation will be given in FIG. 5 with the same reference numerals employed to designate the same parts in FIG. 1.

A transmit data stream SD is input to a serial/parallel conversion circuit (S/P) 1 where it is converted to two parallel data streams $X_k$, $Y_k$. Then the two parallel data streams are differentially coded by a differential coding circuit 2. Here, let the data stream be given as, for example, an NRZ signal of 0 to 5 V. Those differentially coded data $I_k$, $Q_k$ are input to a mapping/filtering circuit 6. The mapping/filtering circuit 6 simultaneously performs mapping processing, as performed by the mapping circuit 3 of FIG. 1, and filtering processing, as performed by the roll-off filter 4 of FIG. 1. In this connection, it is to be noted that the mapping/filtering circuit 6 performs, alternately by a single circuit in a time division manner, mapping/filtering processing on I channel data and mapping/filtering processing on Q channel data. Filtering factors for filtering are initially stored in a factor memory circuit 7.

Since the mapping data MF delivered from the mapping/filtering circuit 6 is composed of serial data formed of I channel data and Q channel data appearing alternately, a serial/parallel conversion circuit 8 separates the serial mapping data MF into the I channel data and Q channel data. The I channel mapping data MFI and Q channel mapping data MFQ delivered from the serial/parallel conversion circuit 8 are input to a quadrature modulator 5 through a change-over switch 9. A fixed amplitude generation circuit 10 is also connected to the change-over switch 9. In a radio communication system of a digital modulation system/analog modulation system-mixed mode called a dual mode, the change-over switch 9 allows the I channel mapping data MFI and Q channel mapping data MFQ which are output from the serial/parallel converter 8 to be supplied to the quadrature circuit 5 when the digital modulation system is selected and a digital signal ADT of fixed amplitude which is generated from the fixed-amplitude generation circuit 10 to the quadrature circuit 5 when the analog modulation system is selected.

The mapping/filtering circuit 6 and factor memory 7 are as follows. In the prior art, filtering is carried out after multiplying input data and factor and adding together results of multiplication. According to the present invention, on the other hand, filtering is carried out by initially storing impulse responses to respective data in the factor memory 7 and adding together impulse responses read out of the factor memory 7. This arrangement obviates the need to provide multipliers for performing a factor multiplication and gates for setting the factors in the multiplier. The factor memory circuit 7 allows filter factor data (impulse response), which has been initially stored as already filter-processed ones, to be sequentially read out in synchronism with a sampling period and supplies them to the mapping/filtering circuit 6.

Figure 9:
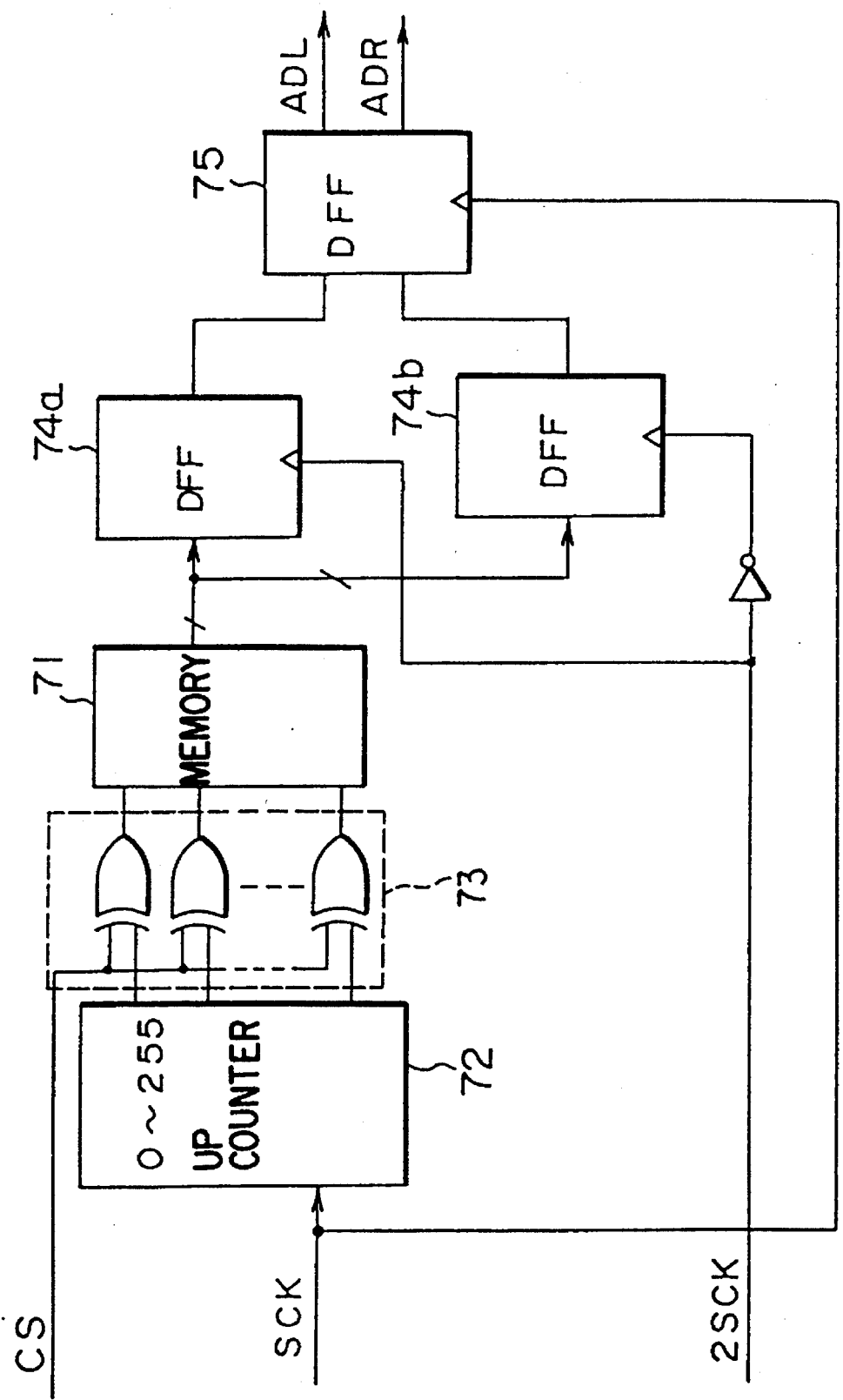
FIG. 9 is a block circuit diagram showing an arrangement of a factor memory circuit in the first embodiment.

FIG. 9 shows an arrangement of the factor memory circuit 7. The factor memory circuit 7 comprises a memory 71 for storing the filter factor data as already filter-processed data, 8-bit address counter 72, exclusive OR circuit 73 comprised of eight exclusive OR (EX-OR) gates to which each bit output of the address counter 72 is supplied, first and second D-type flip-flops 74a, 74b performing alternately complementary operations, and a third D-type flip-flop 75 operated by the outputs of the first and second D-type flip-flops 74a, 74b.

Figure 8:
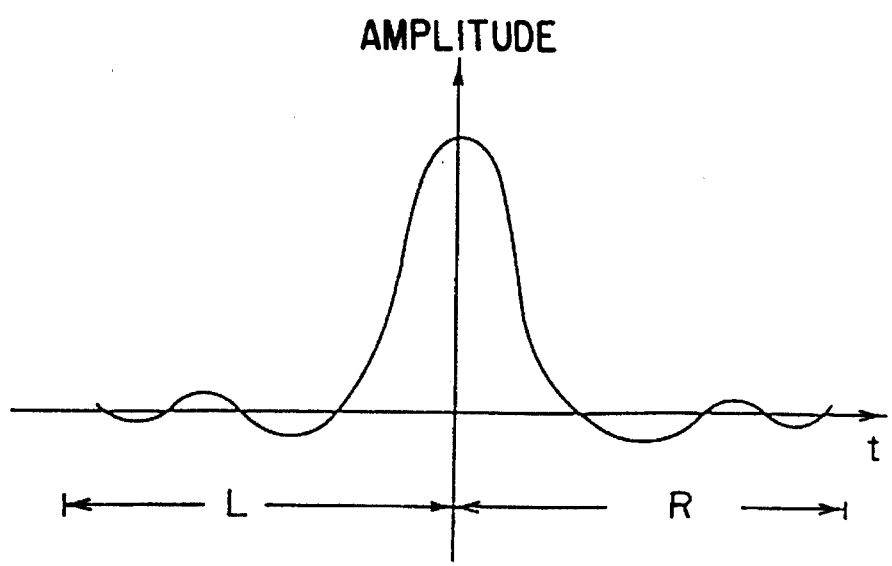
FIG. 8 is a view showing an impulse response of a root roll-off filter for use in the mapping/filtering circuit shown in FIG. 6.

The memory 71 is comprised of a ROM for storing filter factor data as, for example, already filter-processed ones. It is to be noted that, since the filter factors, being required for the I and Q channel data, are the same between the two, the memory stores only those corresponding to one channel only. As will be set out below, the filter factor is line-symmetrical with respect to a time base and the memory stores only one half side of the axial symmetry. In the present invention, a root roll-off filter is used as a filter. By the root roll-off filter is meant a low pass filter so designed that a symbol-to-symbol interference ceases to exist at a determination point of data by providing roll-off filters one at a transmit side and one at a receive side. FIG. 8 shows one example of an impulse response in the root roll-off filter. As evident from FIG. 8, the impulse response is line-symmetrical with a maximal amplitude point as a center on a time base. With attention paid to this feature, only one-side characteristics L of those line-symmetrical portions L, R of the impulse response are stored in the memory 71.

The address counter 72 makes a count-up operation by a sampling clock (a clock 256-times the symbol rate clock for one symbol of the data being, for example, 256 samples) SCK and any of those count values 0 to 255 is supplied as an address to the memory 71 via the EX-OR circuit 73.

The EX-OR circuit 73 allows the address which is output from the address counter 72 to be inverted in accordance with the level of a control signal CS. The control signal CS is an inverted signal of the sampling clock SCK. The inversion of the address is so made as to enable the characteristics L of the impulse response which are stored in memory 71 to be read out as the characteristics R.

Figure 6:
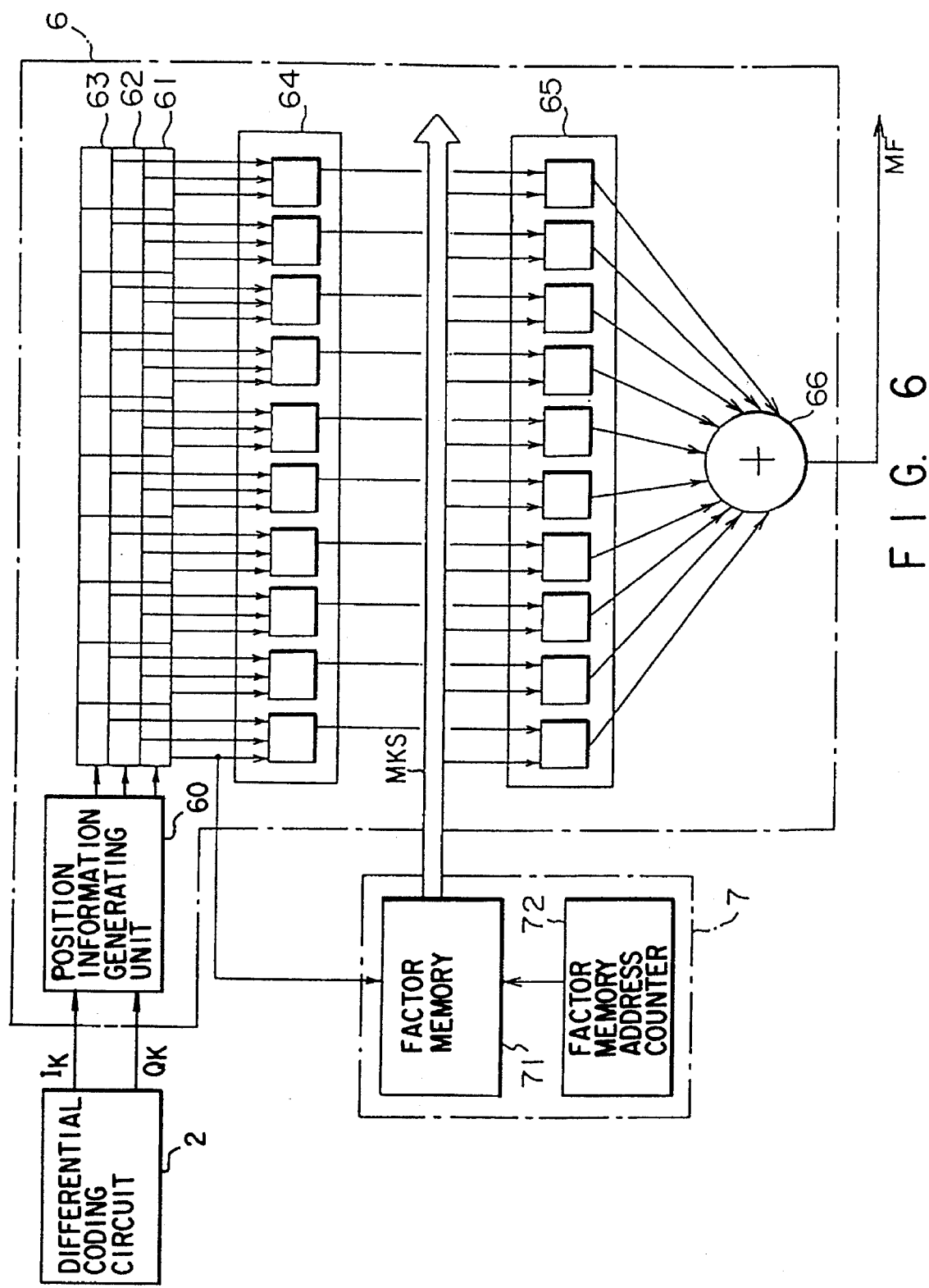
FIG. 6 is a view showing an arrangement of a mapping/filtering circuit for the first embodiment of the present invention.

The mapping/filtering circuit 6 comprises, as shown in FIG. 6 for instance, a position information generation unit 60, three shift registers 61, 62, 63, each, with a series of 10 stages, a numerical value conversion control signal generation unit 64 made up of 10 numerical value conversion signal generation circuits corresponding to the respective stages of the shift registers 61, 62 and 63, a numerical value conversion unit 65 made up of 10 numerical value conversion circuits corresponding to the 10 numerical value conversion control signal generation circuits, and an adder 66 for adding together the outputs of the 10 numerical value conversion circuits.

Figure 7:
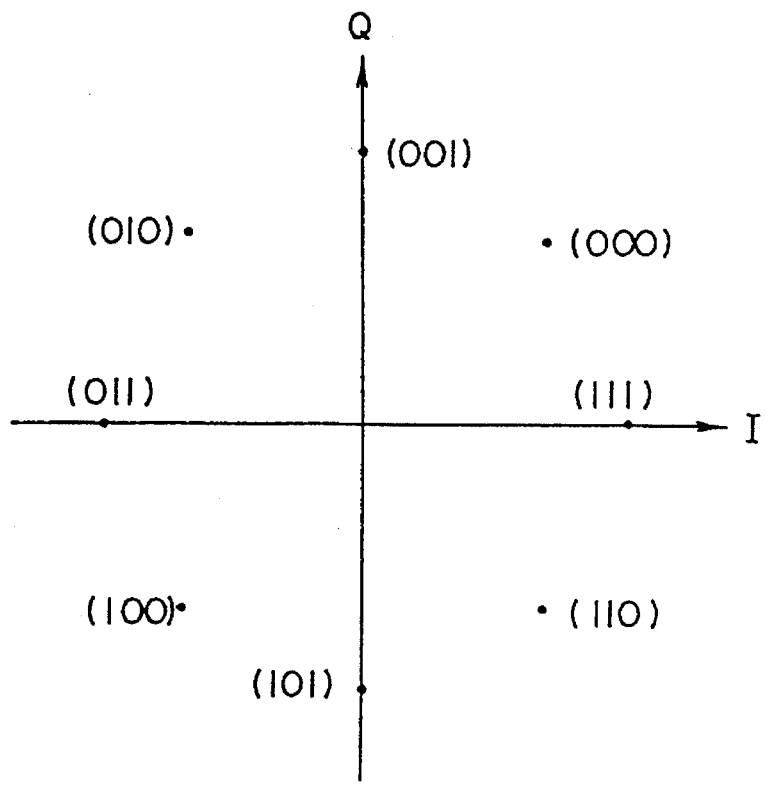
FIG. 7 is a view showing mapping positions for mapping/filtering circuit shown in FIG. 6.

In the position information generation unit 60, the coded data $I_k, Q_k$ supplied from the differential coding circuit 2 are converted to information representative of the phase position on a quadrature axis, for each symbol, and the position information is delivered as an output. The position information is comprised of, as shown in FIG. 7, 3 bit information representing 8 phase positions in the π/4 shifted DQPSK system.

The shift registers 61, 62 and 63, each, are comprised of, as already set out above, serially connected 10 registers and three-bit position information generated from the position information generating unit 60 is shift-input to these shift registers in series form in synchronism with the symbol rate clock. The position information corresponding to 10 symbols are output in parallel form from the corresponding 10 registers.

Based on the respective symbol position information (3 bits) output from the three shift registers 61, 62 and 63, the respective generating circuits of the numerical value conversion control signal generating unit 64 generate AND control signals ANDS and XOR control signals XORS in a corresponding relation of FIG. 11 for respective I channel and Q channel. These control signals ANDS and XORS are supplied to the numerical value conversion unit 65. It is determined that the AND control signal ANDS becomes a logical 0 level (hereinafter referred to as a "0" level) when the amplitude value of the phase position information of the respective symbols on the quadrature axis is on the I axis or on the Q axis, that is, the phase position of the respective symbol is on the Q axis or the I axis and becomes a logical "1" level (hereinafter referred to as a "1" level) when otherwise. The XOR control signal XORS becomes a "1" level when the amplitude value of the phase position is negative on the I axis or on the Q axis and becomes a "0" level when positive.

The respective numerical value conversion circuit of the numerical value conversion unit 65 comprises an AND gate 651 and exclusive OR (EX-OR) gate 652 as shown, for example, in FIG. 12. With the EX-OR gate 652, the filter factor data MKS subjected to filtering process which is read out from the filter memory circuit 7 is gated by the XOR control signal XORS. With the AND gate 651, a signal output from the EX-OR gate 652 is gated by an AND control signal ANDS. The data (numerical values) output from the AND gates 651 are input to the adder 66.

With the numeral value control signal generating unit 64, as set out above, the numerical value conversion control signal is generated and filter factor data is converted to the numerical data in accordance with the numerical value conversion control signal. The reason is that, as set out above, only data on a first quadrant on the phase plane is stored in the factor memory 71 and the filter factor on another quadrant is found.

The adder 66 adds together those filter factors (impulse responses) corresponding to 10 symbols output from the numerical value conversion unit 65. The I channel mapping data and Q channel mapping data, being obtained after addition, are time division multiplexed to provide a serial data MF. The serial data MF is supplied to the serial/parallel conversion circuit 8.

The operation of the π/4 shifted DQPSK modulator of the first embodiment thus arranged will be explained below.

Figures 3, 4:
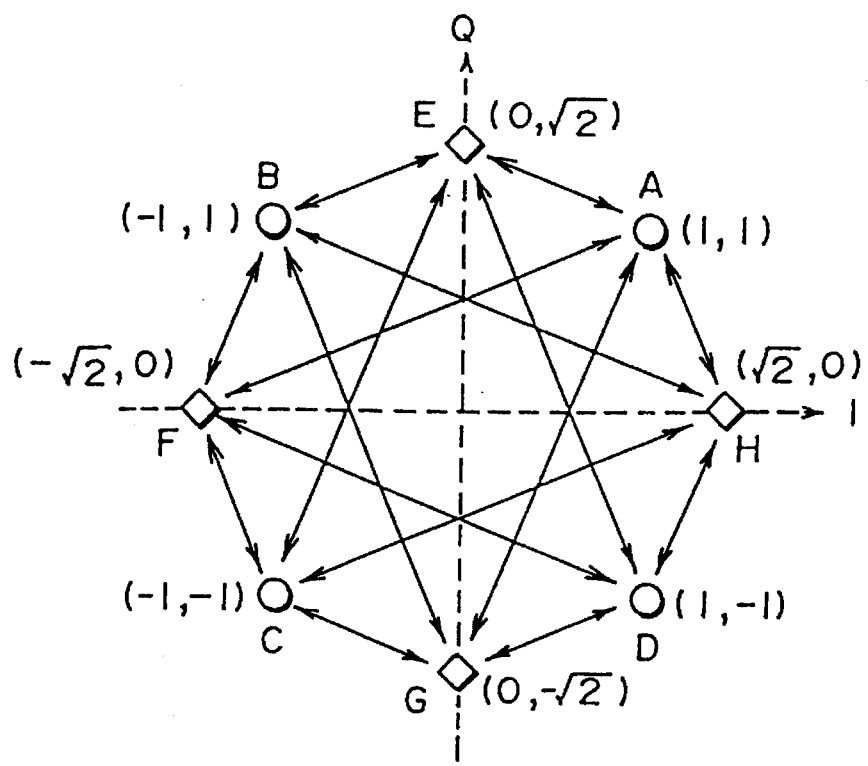
FIG. 3 is a view showing a relation of input digital signals $X_k$, $Y_k$ to an amount of phase variation, $\Delta\phi$, for the π/4 shifted DQPSK system.
FIG. 4 is a view showing mapping positions for the π/4 shifted DQPSK system.

The transmit data SD, being converted by the serial/parallel conversion circuit 1 to a 2 bit parallel signal, is sent to the differential coding circuit 2 where differential coding is carried out. The differential coding data are input to the mapping/filtering circuit 6.

with the mapping/filtering circuit 6, the coded data $I_k, Q_k$ are converted first to the position information representing the phase positions on the I axis and Q axis on the quadrature plane at the position information generating unit 60 for the respective symbols. Even with the present embodiment, it is given that one symbol is 2 bits and represented by 256 samples. In the π/4 shifted DQPSK system, as shown in FIGS. 4 and 7, the number of phase positions are 8 points and the position information is represented by 3 bits. The 3 bit position information are shift-input to the shift registers 61, 62 and 63 in a symbol-by-symbol manner. Each time one symbol position information is newly input, the position information corresponding to 10 symbols held in the shift registers 61, 62 and 63 are supplied in parallel manner to the respective numerical value conversion control signal generating circuit in the numerical value conversion control signal generating unit 64. In the numerical value conversion control signal generating circuit, the numerical value conversion control signals, that is, AND control signal ANDS and XOR control signal XORS, corresponding to the respective position information are generated. The AND control signal ANDS and XOR control signal XORS are supplied to the numerical value conversion circuits in the numerical value conversion unit 65.

The filter factor data subjected to filtering processing which are stored in the factor memory 71 are read out in a time sequential manner from the factor memory circuit 7 in accordance with the address designation of the address counter 72 and supplied to the respective numerical value conversion circuits in the numerical value conversion unit 65. In consequence, with the respective numerical value conversion circuit, the filter factor data subjected to filtering processing which are read out from the factor memory 71 are converted to the numerical value by the AND control signal ANDS and XOR control signal XORS. Here, only the factor data on the first quadrant on the phase plane are stored in the factor memory 71 and they are repeatedly read out. The read-out data are converted to the filter factor data (numerical values) on the quadrants corresponding to the position in accordance with that position information of the respective symbols stored in the shift registers 61, 62 and 63.

The memory 71 stores only one half-side of the impulse response of the root roll-off filter shown in FIG. 8. Since the impulse response is line-symmetrical with a maximal amplitude point as a center, the memory 71 stores the one-side characteristics, here only the L-side characteristics. It is, therefore, necessary to create the other-side characteristics R. That is, when the other-side characteristics R are to be read out, the control signal CS becomes a "1" level in the factor memory circuit 7. For this reason, the address delivered from the address counter 72 is inverted by the EX-OR circuit 73 and sent to the memory 71. As a result, the data of the characteristics "L" are read out in an inverted sequence, that is as the data of the characteristics "R" from the memory 71.

Figure 10:
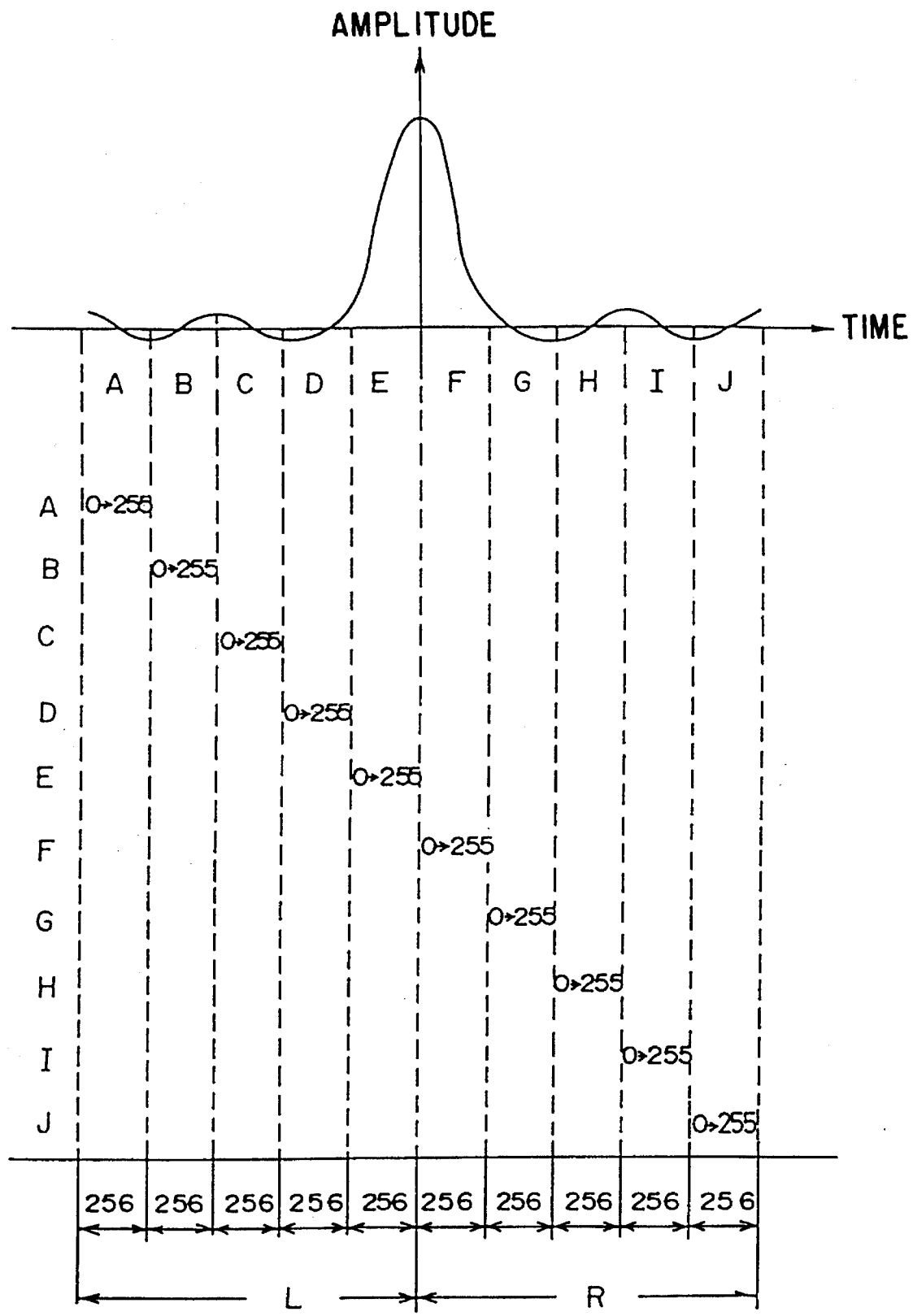
FIG. 10 is a view for explaining the operation of reading out factors stored in the factor memory circuit in the first embodiment.

FIG. 10 is used to explain the operation of the apparatus. As shown in FIG. 10, the impulse response is divided into 10 areas and the memory circuit 7 shown in FIG. 9 is provided for each area. The factor data of the respective area is supplied to the corresponding numerical value conversion circuit in the numerical value conversion unit 65. If, for example, the control signal CS is set to the "0" level when the factor data of the area "A" is read out, the addresses 0 to 255 output from the address counter 72 are sent, as they are, to the memory 71. For this reason, the factor data of the area "A" is read out from the memory 71 in an ascending order starting with the address corresponding to 0. When, on the other hand, the control signal CS is set to be a "1" level, those addresses 0 to 255 output from the address counter 72 are supplied, while being inverted by the EX-OR circuit 73, to the memory 71. For this reason, the factor data of the area "A" are read out in a descending order starting with the address 255. This corresponds to the situation in which the factor data of the area "J" line-symmetrical with respect to the address "A" is read out in the ascending order starting with and corresponding to the address 0. Since the control signal CS is an inverted signal of the sampling clock SCK and signals CS and SCK are commonly supplied to the memory circuit 7 for each area "A" through "J" over the whole area, those factor data corresponding to the addresses 0 of the areas "A", "B", "C", "D" and "E" are simultaneously read out from the factor memory 71 and, hereinafter, each time the system clock SCK is entered, those corresponding to the address 0 of the areas "J", "I", "H", "G", "F", those corresponding to the addresses 1 of the areas "A", "B", "C", "D", "E", those corresponding to the addresses 1 of the areas "J", "I", "H", "G", "F", . . . are read out.

As set out above, the data converted to numerical values in the numerical value conversion unit 65 after being read out from the memory 71 are added together by the adder 65 and output as filter-processed mapping data MF. Here, the factor data read out from the factor memory circuit 7 are converted by the numerical value conversion unit 65 to I and Q channel filter factors in accordance with the sampling clock SCK, so that the data output from the adder 66 become serial data with the I and Q channel data multiplexed in a time division manner. With the circuit of the present embodiment, the serial data MF is input to the serial/parallel conversion circuit 8 where it is separated into the I channel data and Q channel data.

The I channel data MFI and Q channel data MFQ are input to the change-over switch 9. When communication is conducted by the digital modulation system, that is, when the digital mode is involved, the change-over switch 9 selects the I channel data MFI and Q channel data MFQ to allow transfer to the quadrature modulator 5. A transmit intermediate frequency signal is output from the quadrature modulator 5 in a manner to be quadrature-modulated by the I channel data MFI and Q channel data MFQ. The transmit intermediate signal is frequency-converted to a radio channel frequency signal by means of a transmitting circuit shown in FIG. 13 and, being amplified by an amplifier not shown to a predetermined transmit power level, transmitted from an antenna.

Figure 13:
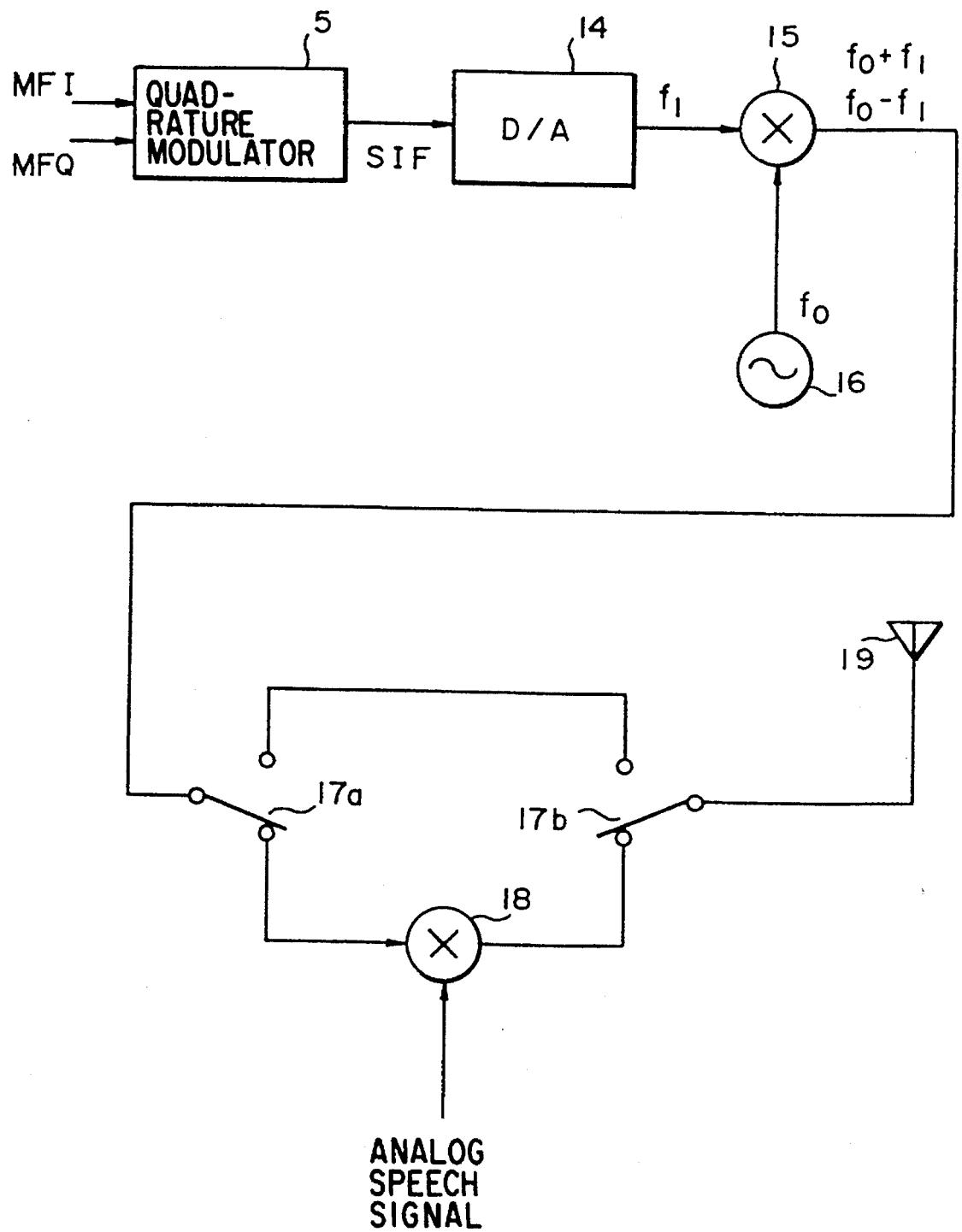
FIG. 13 shows an arrangement of one example of a transmitting circuit in the first embodiment.

As shown in FIG. 13, the transmit intermediate frequency signal SIF, being quadrature modulated, is input to a mixer 15 via a D/A converter 14. A local oscillation frequency signal from a local oscillator 16 is supplied to the mixer 15. The output of the mixer 15 is routed by a switch 17a into two paths. A first output terminal of the switch 17a is connected to a first input terminal of a switch 17b and a second output terminal of the switch 17a is connected to a second input terminal of the switch 17b through a mixer 18. An analog speech signal is supplied to the mixer 18. In the case where a digital modulation system is adopted, the switches 17a, 17b are switched to their first terminal sides to allow the output of the mixer 15 to be delivered as it is.

In the case where an analog modulation system is adopted, the switches 17a, 17b are switched to their second terminal sides to allow the output of the mixer 15 to be delivered in a manner to be frequency modulated by the analog speech signal. When communication is made by the analog modulation system, that is, in the analog mode, the change-over switch 9 selects a digital signal of fixed amplitude generated from the fixed-amplitude generation circuit 10 and allows it to be supplied to the quadrature modulator 5. For this reason, the quadrature modulator 5 delivers the transmit intermediate frequency signal of a given frequency in accordance with the digital signal. This transmit intermediate frequency signal is converted by the mixer 15 to a radio channel signal and the signal is supplied to the mixer 18 for frequency modulation. With the mixer 18, the radio channel signal is frequency modulated by the analog speech signal so that the FM modulated signal is transmitted from the antenna 19. Though being not shown, a transmit amplifier is connected to a preceding stage of the antenna 19.

According to the π/4 shifted DQPSK modulator of the present embodiment, it is possible to obtain various advantages.

(1) It is possible to obtain filtered mapping data by shift-inputting the position information on the phase space defined by the I, Q quadrature axes obtained for the respective symbols to the shift registers 61, 62 and 63, sequentially reading out the filter factor data corresponding to the initially stored, predetermined samples (256 samples) from the factor memory circuit 7 for each entry of one symbol position information and converting the filter factor data to a corresponding numerical value on the basis of 10 symbol position information delivered in parallel manner from the shift registers 61, 62, 63.

That is, according to the conventional circuit, it is possible to obtain filtered mapping data by sequentially shift-inputting mapping data sampled with 256 samples while fixing the filter factors and multiplying the data by the filter factors. According to the circuit of the present invention, on the other hand, it is possible to obtain filtered mapping data by, while fixing the mapping data, sequentially reading out the filter factors corresponding to 256 samples from the factor memory circuit 7.

In the prior art, it has been necessary to provide a 2,560-stage shift register, corresponding 2,560 multipliers and their gates. According to the present invention, on the other hand, it is only necessary to provide the shift registers 61, 62, 63 of as small as 10 stages, 10 numerical value conversion signal generating circuits in the numerical value conversion signal generating unit 64 and 10 numerical value conversion circuits (gates) in the numerical value conversion unit 65. It is, therefore, possible to provide the circuit configuration of the filter circuit as a largely-simplified compact unit and the more effectively achieve a high density integration. It is to be noted that the number of stages of the shift registers 61, 62 and 63 has only to correspond to the number of divided areas for the filter factors and not restricted to 10 stages only.

(2) With the mapping/filtering circuit 6, the mapping and filtering processings are performed, in a time division manner, on the I channel data and Q channel data. It is not necessary to independently provide the mapping/filtering circuit for I channel data and mapping/filtering circuit for Q channel data. This can make the circuit configuration a largely-simplified compact unit.

(3) It is possible to obtain a filtered mapping data by storing the filter factor data subjected to filtering processing and performing simpler logical processing by the numerical value conversion unit 65 on the filter factor data. This obviates the need to provide any multipliers for multiplying the mapping data by the filter factor data. In consequence, the circuit configuration of the filtering circuit can be provided as a simpler compact one.

(4) It is possible to obtain filtered data by storing, in the memory 71, only the filter factor data on the first quadrant on the quadrature axes and converting the filter factor data to a numerical value on the basis of the phase position information of the respective symbol. In comparison with the case where data on all quadrants on the quadrature axes are stored it is possible to reduce a requisite capacity of the memory 71 and hence to obtain an inexpensive circuit.

(5) As the filtering characteristics of the filter circuit use is made of the characteristics of the root roll-off filter by which the impulse response provides an axial symmetry with the maximal amplitude level as a center. By doing so, only the one-side characteristics L of the impulse response are stored in the memory 71. By inverting the address by the EX-OR circuit 73 and accessing the memory 71, the one-side characteristics L of the impulse response are read out as the other-side characteristics R of the impulse response. Therefore, it is possible to reduce a requisite capacity of the memory 71 and hence to obtain a simpler, compact and low-cost circuit arrangement.

(6) The change-over switch 9 is provided at the preceding stage of the quadrature modulator 5 and, in the analog mode, the digital signal ADT of fixed amplitude is selected by the change-over switch 9 in place of the mapping data MFI, MFQ and the selected signal is supplied to the quadrature modulator 5 where an intermediate frequency signal of a given frequency is generated. This eliminates the need to provide any analog-mode-only transmit local oscillator and can provide, as a simpler and compact one, the circuit configuration of a mobile radio communications device of a dual mode type, that is, a digital mode/analog mode-mixed mode type.

The present invention is not restricted to the aforementioned embodiment and various changes and modifications of the present invention can be made without departing the spirit and scope of the present invention.

If the root roll-off filter is used as the filter circuit as set out above in conjunction with the above embodiment, it is difficult to make the symbol-to-symbol interference a zero. The symbol-to-symbol interference, if being produced, causes abrupt characteristics to occur at the leading and trailing edge portions of a burst transmit waveform. These characteristics, being subjected to Fourier expansion, is expanded to various frequencies. That is, a broad frequency band is required in a burst transmission in the case where the root roll-off filter is used.

In order to eliminate this inconvenience, it is preferable to control the high frequency switch of a transmitting circuit so as to allow the gate to be disabled only during a period corresponding to the leading and trailing edge portions of the burst transmission waveform. In the case, a horn-like waveform which emerges at the leading and trailing edge portions of the burst transmission waveform is suppressed, thus preventing the transmission band from being broadened to any unnecessary extent.

Figure 15:
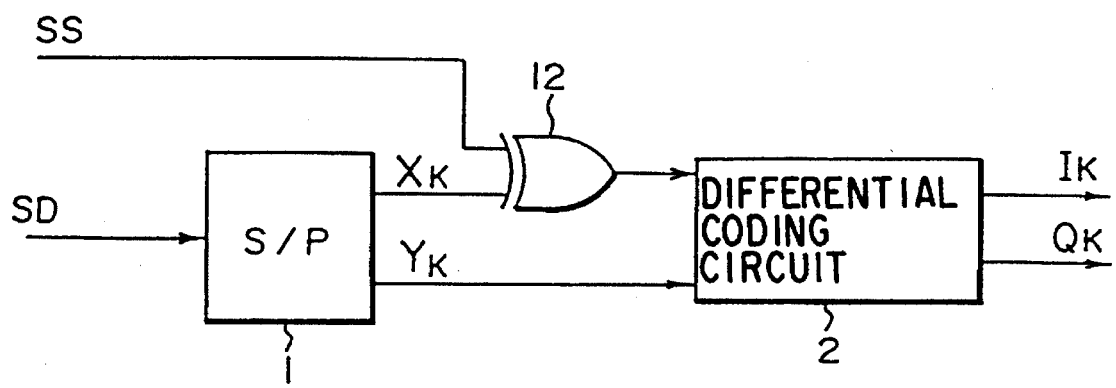
FIG. 15 is a block circuit diagram showing a major section of a π/4 shifted DQPSK modulator according to a second embodiment of the present invention.

In order to make a spectrum normal after making frequency conversion at the transmitting circuit, it is preferable to, as shown, for example, in FIG. 15, insert an exclusive OR circuit 12 on that signal path of the data stream $X_k$ delivered from the serial/parallel conversion circuit 1.

Figure 14:
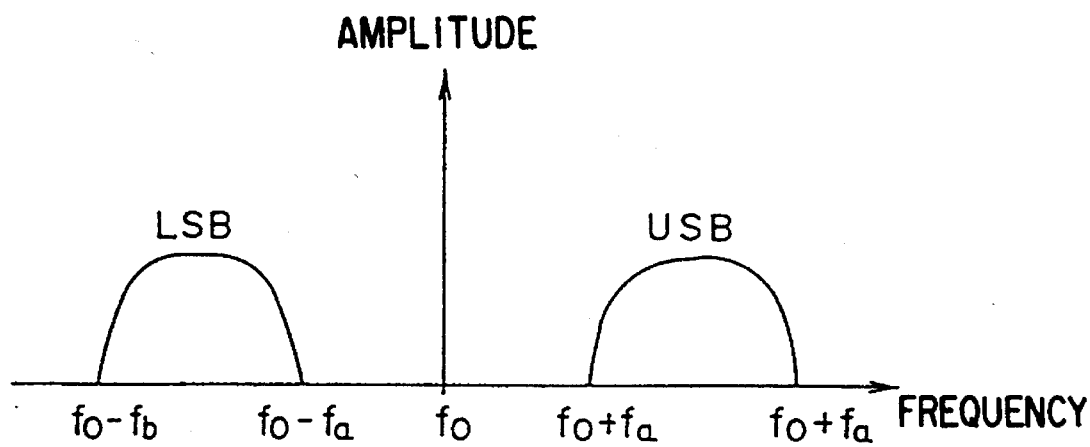
FIG. 14 is a view showing a spectrum characteristic of a transmit channel signal after a frequency conversion has been achieved in the transmitting circuit.

That is, the transmit intermediate frequency signal delivered as a modulated signal from the quadrature modulator 5 is converted to a radio channel frequency signal by means of the transmitting circuit shown in FIG. 13. With $f_0$ representing the oscillation frequency of the mixer 16 and $f_1$ the frequency of the intermediate frequency signal SIF, two radio channel frequency signals $f_0+f_1$ and $f_0-f_1$ are output from the mixer 15. Here, if the transmit intermediate frequency signal (modulated signal) has a band $f_a$ to $f_b$, it follows that $f_0+f_1$ becomes $f_0+f_a$ to $f_0+f_b$, and $f_0-f_1$ becomes $f_0-f_b$ to $f_0-f_a$. This frequency characteristic is as shown in FIG. 14. As evident from FIG. 14, if $f_a<f_b$, then an LSB-appearing spectrum becomes one inverted by the frequency conversion.

Therefore, based on the relation among data $X_k$, $Y_k$ preceding the coding and the phase variation $\Delta\phi$ defined as shown in FIG. 3, the differentially coded data is subjected to a spectrum inversion. That is, upon comparison between the LSB spectrum and the USB spectrum shown in FIG. 14, it is appreciated that their frequency variations are equal in absolute value to, but different in polarity from, each other. From FIG. 3, it is also appreciated that, out of the data $X_k$, $Y_k$ preceding the differential coding, phase polarity-indicating one is the data $X_k$. Stated another way, when the data $X_k=0$ the phase variation $\Delta\phi$ goes in a positive direction and when the data $X_k=1$ the phase variation $\Delta\phi$ goes in the negative direction.

For this reason, the polarity of the data $X_k$ is properly inverted by controlling the exclusive OR circuit 12 by a control signal SS as shown in FIG. 15. The control signal SS is set to any of "0" and "1" levels in accordance with the structure of a radio unit. By doing so, the spectrum following the frequency conversion becomes normal even if any of the LSB and USB is involved. As a result, the frequency conversion can be conducted without taking care of the spectrum inversion.

Although, in the above embodiment, the position information generating unit 60 has been explained as being provided in the mapping/filtering circuit 6 so as to generate the phase position information of the respective symbols, it may be possible to provide both the differential coding function and position formation generation function to the differential coding circuit 2 so as to generate phase position information.

Not only the circuit configuration of the mapping/filtering circuit and that of the factor memory circuit but also the number of samples for one symbol data, and so on, can be varied or modified without departing from the spirit and scope of the present invention. For example, the filter is not restricted to the root roll-off type and a roll-off type may be used.

Industrial Applicability

According to the present invention, as set out above, for the respective symbol of a plurality of series of data streams, position information on a phase amplitude plane of a carrier carrying a specific symbol is obtained from both the bit information of the specific symbol and the position information, on the phase amplitude plane of the carrier, of a symbol transmitted immediately before the specific symbol. The position information is shift-input to a plurality of stages of shift registers in serial manner in synchronism with a symbol rate and respective amplitude information are detected from corresponding position information delivered in parallel manner from the shift registers. In parallel therewith, the address is output in synchronism with a sample clock of a frequency plural times the symbol rate. The filter factor information corresponding to a predetermined stage position of the shift register is output based on the address and the position information stored in the predetermined stage position of the shift register. The filter factor information and above amplitude information are calculated and a total sum is found as results of calculation. The corresponding total sum is wave-shaped and output as modulated data.

According to the present invention, therefore, the number of gates of the filter is reduced and it is possible to provide a π/4 shifted DQPSK modulator which can largely reduce the size of its circuit arrangement.

What is claimed is:

1. A π/4 shifted DQPSK modulator comprising:

serial/parallel converting means for converting a transmit data stream into a plurality of parallel data streams;

position information generating means for obtaining positioning information, the position information comprising a sequence of position information elements, each position information element corresponding to a respective symbol represented in the plurality of parallel data streams, each position information element representing a position on a phase amplitude plane of a carder carrying a corresponding specific symbol and being determined from the specific symbol and the position information element of a symbol carried immediately previous to the specific symbol;

a shift register for allowing each position information element which is output from said position information generating means to be received in synchronism with a symbol rate and for sequentially shifting the position information elements of a predetermined number of stored symbols upon each receipt of a new position information element and for outputting the position information elements of all the predetermined number of the stored symbols in a parallel manner;

conversion control signal generating means for detecting respective amplitude information from the corresponding position information elements of the predetermined number of symbols which are output in the parallel manner from the shift register;

address generating means for counting in synchronism with a sampling clock of a frequency plural times the symbol rate and for generating an address corresponding to a count value;

memory means for outputting, based on the address generated from said address generating means and the position information elements stored in each respective stage of said shift register, filter factor information corresponding to the respective stages;

plural calculating means for performing a calculation on the filter factor information output from said memory means and the respective amplitude information obtained from said conversion control signal generating means; and totally summing means for finding a total sum of results of the calculations obtained by said plural calculating means and for wave-shaping the total sum of the results and outputting a wave-shaped total sum as modulated data.

2. The π/4 shifted DQPSK modulator according to claim 1, wherein said conversion control signal generating means detects the amplitude information of an in-phase component and the amplitude information of a quadrature component from the respective position information elements output in the parallel manner from said shift register and outputs the corresponding amplitude information in a time division manner;

said plural calculating means performs the calculation on the filter factor information output from said memory means, and the amplitude information of the in-phase component and the amplitude information of the quadrature phase component in a time division manner, and outputs results of the calculation; and said totally summing means finds the total sum of the results of the calculation in a time division manner and separates the total sum output into a total sum output corresponding to the in-phase component and a total sum output corresponding to the quadrature phase component.

3. The π/4 shifted DQPSK modulator according to claim 1, wherein said memory means initially stores the filter factor information subjected to filtering processing.

4. The π/4 shifted DQPSK modulator according to claim 1, wherein said memory means stores, out of an impulse response of a root roll-off filter having an axial symmetry with a maximum amplitude point as a center, only those characteristics on one side of the maximum amplitude point; and when the other side's characteristics not stored in said memory means are to be read out, said address generating means supplies an address to said memory means in a manner to have its count value logically inverted.

* * * * *